United States Patent
Nishiyama et al.

(10) Patent No.: US 12,249,155 B2
(45) Date of Patent: Mar. 11, 2025

(54) BOARDING PERMISSION DETERMINATION DEVICE AND BOARDING PERMISSION DETERMINATION METHOD

(71) Applicant: Nissan Motor Co., Ltd., Yokohama (JP)

(72) Inventors: Jo Nishiyama, Kanagawa (JP); Hirofumi Inoue, Kanagawa (JP); Takehito Teraguchi, Kanagawa (JP); Yu Shikoda, Kanagawa (JP); Shota Okubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 500 days.

(21) Appl. No.: 17/426,221

(22) PCT Filed: Jan. 29, 2019

(86) PCT No.: PCT/IB2019/000103
§ 371 (c)(1),
(2) Date: Jul. 28, 2021

(87) PCT Pub. No.: WO2020/157531
PCT Pub. Date: Aug. 6, 2020

(65) Prior Publication Data
US 2022/0101633 A1    Mar. 31, 2022

(51) Int. Cl.
*G06V 20/56*    (2022.01)
*B60W 60/00*    (2020.01)
(Continued)

(52) U.S. Cl.
CPC ....... *G06V 20/56* (2022.01); *B60W 60/00253* (2020.02); *G06T 7/20* (2013.01); *G06V 40/28* (2022.01); *G08G 1/205* (2013.01)

(58) Field of Classification Search
CPC . G06V 20/56; G06V 40/28; B60W 60/00253; G06T 7/20; G06T 7/00; G08G 1/205; G06Q 10/02; G06Q 50/30
See application file for complete search history.

(56) References Cited

U.S. PATENT DOCUMENTS 10,088,846 B2 *   10/2018   Gao ................ G06V 40/20
10,726,360 B2 *   7/2020    Fujimoto ........... G06Q 10/02
(Continued)

FOREIGN PATENT DOCUMENTS

CN    108632336 A    10/2018
JP    2012-14482 A    1/2012
(Continued)

OTHER PUBLICATIONS

Machine Translation JP 2016218895 (year: 2016).*
Chinese Office Action of Jan. 17, 2024 of corresponding Chinese Patent Application No. 201980090816.9.

*Primary Examiner* — Jean Paul Cass
*Assistant Examiner* — Lidia Kwiatkowska
(74) *Attorney, Agent, or Firm* — Global IP Counselors, LLP

(57) ABSTRACT

A boarding permission determination device includes a controller that receive a signal from a sensor that is mounted on a vehicle to detect at least a prescribed movement of a person in the periphery of the vehicle while the vehicle is traveling. The controller is configured to determine a stop location for the vehicle and register information indicating characteristics of the person in a storage device when the prescribed movement of the person was detected while the vehicle is traveling. The controller is configured to control the vehicle such that the vehicle stops at the stop location that was determined. The controller is configured to control a prescribed device mounted on the vehicle such that the person can board the vehicle after the vehicle is stopped at (Continued)

the stop location, after recognizing the person that was detected while the vehicle was traveling using the information.

13 Claims, 8 Drawing Sheets

(51) Int. Cl.
    *G06T 7/20*           (2017.01)
    *G06V 40/20*       (2022.01)
    *G08G 1/00*         (2006.01)

(56) References Cited

U.S. PATENT DOCUMENTS

| | | | |
|---|---|---|---|
| 10,885,354 B2* | 1/2021 | Maeda | G01S 15/87 |
| 11,403,725 B2* | 8/2022 | Hasegawa | G05D 1/0088 |
| 11,586,223 B2* | 2/2023 | Iwasaki | G08G 1/202 |
| 2017/0153714 A1* | 6/2017 | Gao | G05D 1/0088 |
| 2018/0129981 A1* | 5/2018 | Fujimoto | G08G 1/0962 |

FOREIGN PATENT DOCUMENTS

| | | | |
|---|---|---|---|
| JP | 2015-191264 A | | 11/2015 |
| JP | 2016218895 A | * | 12/2016 |
| JP | 2018-73351 A | | 5/2018 |
| WO | 2018/050729 A1 | | 3/2018 |
| WO | 2018/142528 A1 | | 8/2018 |
| WO | 2018/189952 A1 | | 10/2018 |

* cited by examiner

BOARDING PERMISSION DETERMINATION DEVICE AND BOARDING PERMISSION DETERMINATION METHOD

CROSS-REFERENCE TO RELATED APPLICATIONS

This application is a U.S. national stage application of International Application No. PCT/IB2019/000103, filed on Jan. 29, 2019.

BACKGROUND

Technical Field

The present invention relates to a boarding permission determination device and a boarding permission determination method.

Background Information

A technology for determining the orientation of the face of a person around a vehicle or a bodily movement of a person (such as the raising of a hand) from an image, and notifying a taxi driver of the presence/absence of a prospective passenger is known from the prior art (Japanese Laid-Open Patent Application No. 2012-14482—Patent Document 1).

SUMMARY

The development of driverless autonomous driving vehicles has intensified in recent years. Furthermore, demonstration experiments for robot taxis, which utilize autonomous driving vehicles as a taxi service, are also underway. These robot taxis are based on a service for accepting an advance reservation from a user's mobile terminal, or the like, and transporting the user from a boarding location included in the reservation to a deboarding location. However, even though cases could be assumed in which a pedestrian wishes to immediately use on the spot a traveling robot taxi, there is no means to hail the robot taxi on the spot. In addition, even if a hailed robot taxi were to stop, if the robot taxi were to carelessly unlock a door, a person other than the one who signaled for the robot taxi might board the vehicle by mistake.

Given the problems described above, an object of the present invention is to provide a boarding permission determination device and a boarding permission determination method that enables a person who has sent a signal indicating a desire to board a vehicle to do so.

A boarding permission determination device according to one aspect of the present invention comprises a controller that uses a sensor mounted on a vehicle to detect at least a prescribed movement of a person in the periphery of the vehicle while the vehicle is traveling. When the prescribed movement of a person is detected while the vehicle is traveling, the controller determines a stop location for the vehicle, controls the vehicle such that the vehicle stops at the determined stop location, and, when the person that was detected while the vehicle was traveling is recognized after the vehicle is stopped at the stop location, controls a prescribed device mounted on the vehicle so that the person can board the vehicle.

By means of the present invention, it is possible to enable a person who has sent a signal indicating a desire to board a vehicle to do so.

BRIEF DESCRIPTION OF THE DRAWINGS

Referring now to the attached drawings which form a part of this original disclosure.

DETAILED DESCRIPTION OF EMBODIMENTS

Figure 1:
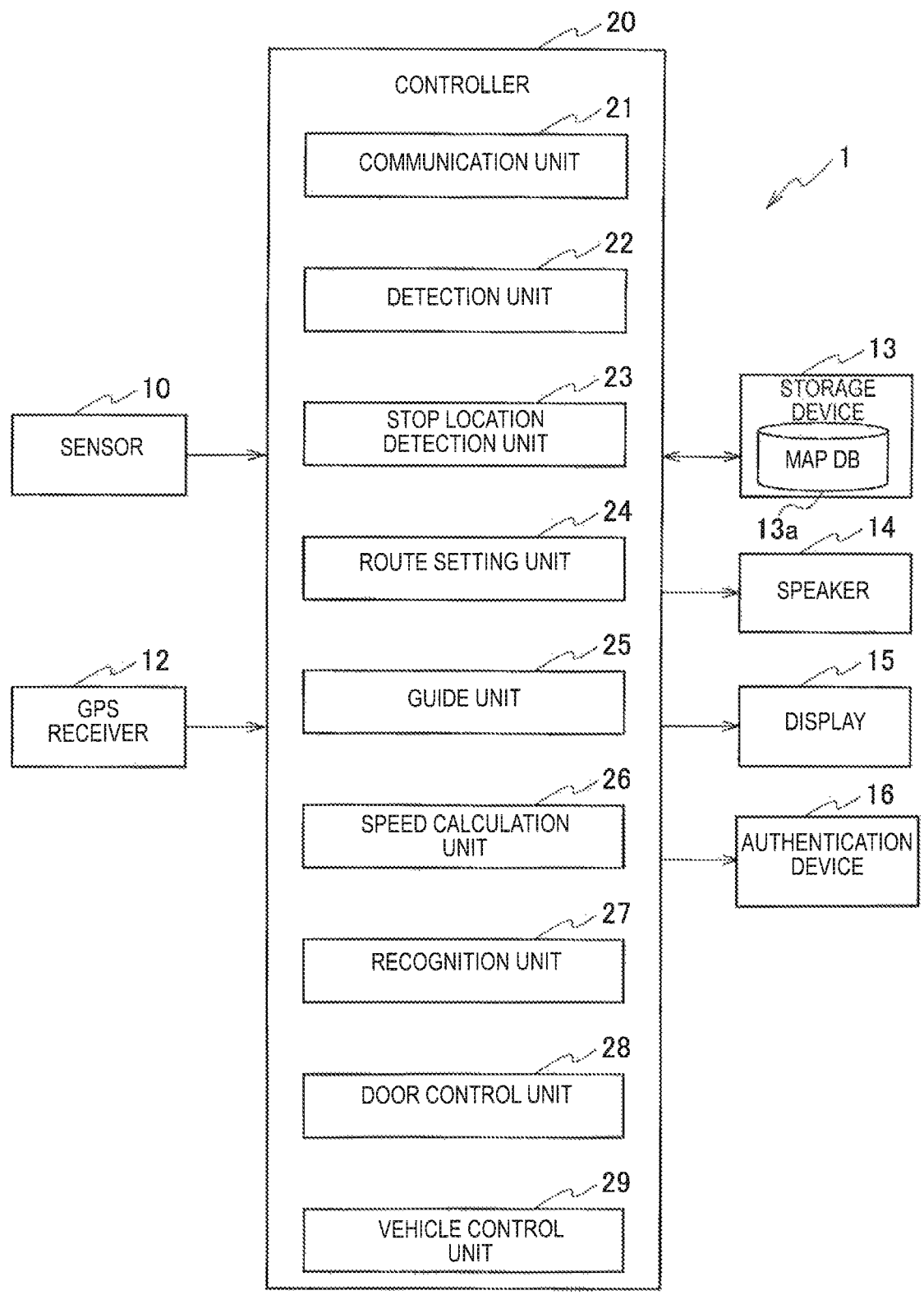
FIG. 1 is a schematic overview of a boarding permission determination device according to a first embodiment of the present invention.

Embodiments of the present invention are described below with reference to the drawings. In the descriptions of the drawings, identical parts have been assigned the same reference numerals, and their descriptions have been omitted.

First Embodiment

A configuration example of a boarding permission determination device 1 according to the present embodiment will be described with reference to FIG. 1. As one example, the boarding permission determination device 1 is mounted on a driverless autonomous driving vehicle. In the present embodiment, the autonomous driving vehicle is described as a taxi. Thus, the driverless autonomous driving vehicle can be described as a robot taxi or an unmanned taxi. However, the boarding permission determination device 1 is not limited to being mounted on an autonomous driving vehicle. The boarding permission determination device 1 may be mounted on a vehicle that has a driver. A vehicle that has a driver may be a vehicle having an autonomous driving function or a vehicle that does not have an autonomous driving function. A vehicle that has a driver may be a vehicle that can switch between autonomous driving and manual driving. The autonomous driving level that is controlled by the driverless autonomous driving vehicle is level 4 or higher. The autonomous driving level that is controlled by a vehicle that has a driver is level 1 or higher.

As shown in FIG. 1, the boarding permission determination device 1 comprises a sensor 10, a GPS receiver 12, a controller 20, a storage device 13, a speaker 14, a display 15, and an authentication device 16.

The sensor 10 is a device that is mounted on an autonomous driving vehicle and that detects objects around the autonomous driving vehicle. The sensor 10 includes a camera, a LiDAR, a radar, a millimeter wave radar, a laser range finder, a sonar, and the like. The objects around the autonomous driving vehicle that sensor 10 detects includes moving objects, such as other vehicles different from the autonomous driving vehicle, motorcycles, bicycles, and pedestrians, as well as stationary objects, such as obstacles, fallen objects, and parked vehicles. In addition, the sensor 10 detects the position, posture (yaw angle), size, velocity, acceleration, deceleration, and the yaw rate of the moving objects and stationary objects with respect to the autonomous driving vehicle. In addition, the sensor 10 may include a wheel speed sensor, a steering angle sensor, a gyro sensor, and the like. The sensor 10 outputs the detected information to the controller 20. In the present embodiment, the sensor 10 also may be read as a camera.

The GPS receiver 12 detects the location information of the autonomous driving vehicle on the ground by receiving radio waves from an artificial satellite.

The location information of the autonomous driving vehicle detected by the GPS receiver 12 includes latitude and longitude information. The GPS receiver 12 outputs the detected location information of the autonomous driving vehicle to the controller 20.

The controller 20 is a general-purpose microcomputer comprising a CPU (central processing device), memory, and an input/output unit. A computer program is installed in the microcomputer to cause it to function as the boarding permission determination device 1. By executing the computer program, the microcomputer functions as a plurality of information processing circuits included in the boarding permission determination device 1. Here, an example is shown in which the plurality of information processing circuits included in the boarding permission determination device 1 is realized in software, but the information processing circuits can of course comprise dedicated hardware for executing each of the information processes shown below. In addition, the plurality of information processing circuits may be realized in discrete hardware. The controller 20 comprises, as an example of the plurality of information processing circuits, a communication unit 21, a detection unit 22, a stop location detection unit 23, a route setting unit 24, a guide unit 25, a speed calculation unit 26, a recognition unit 27, a door control unit 28, a vehicle control unit 29.

The speaker 14 is installed inside the vehicle cabin (inside) or outside of the vehicle (outside) of the autonomous driving vehicle and outputs sound. The display 15 is installed inside the vehicle cabin (inside) or outside of the vehicle (outside) of the autonomous driving vehicle and outputs images. Images include still images and moving images. In the case that the display 15 is installed outside of the vehicle, it should be installed in a position that is easily seen by a prospective passenger. One example of such a position is the lower side (lower half) of a door 18. The display 15 has a touch panel function.

The communication unit 21 is an interface that connects to a communication network and sends/receives data to/from a data center (not shown). The communication network is configured by a wireless communication method, and is, for example, the Internet. As an example, the data center uses the Internet to remotely control autonomous driving vehicles.

The detection unit 22 uses the sensor 10 to detect pedestrians that are around the autonomous driving vehicle while the autonomous driving vehicle is traveling. Specifically, the detection unit 22 first extracts a plurality of objects from images (including moving images) acquired by the sensor 10. An object is a collection of multiple pixels. The plurality of objects include a pedestrian's hands, wrists, shoulders, head, chest, hips, knees, ankles, toes, fingertips, eyes, nose, mouth, ears, and the like. The detection unit 22 may extract a collective object of the pedestrian's eyes, nose, mouth, ears, etc., as the pedestrian's face. In order to facilitate the extraction of objects, the detection unit 22 may remove noise, distortion, etc., from the image. In addition, the detection unit 22 may accentuate the outline of an object, or adjust the brightness and hue of the image. It thereby becomes possible for the detection unit 22 to easily extract the object. The detection unit 22 carries out pattern matching with respect to the extracted object. As an example, pattern matching means comparing an extracted object A with learning data and recognizing that the extracted object A as a pedestrian's face. The learning data for pattern matching is stored in the storage device 13. By means of pattern matching, the detection unit 22 can detect objects around the autonomous driving vehicle as pedestrians. The storage device 13 is a storage device that is different from the memory of the controller 20, and is a hard disk, a solid-state drive, or the like.

When detecting a pedestrian, the detection unit 22 also detects the movement of the pedestrian. As described above, since the objects include the hands, elbows, etc., of the pedestrian, time-series data of these objects are data indicating movements of the hands, elbows, etc., of the pedestrian. That is, moving images acquired by the sensor 10 include time-series information of the movements of body parts (hands, elbows, etc., described above) of pedestrians. This type of time-series information of body parts may be two-dimensional information or three-dimensional information.

Figure 2:
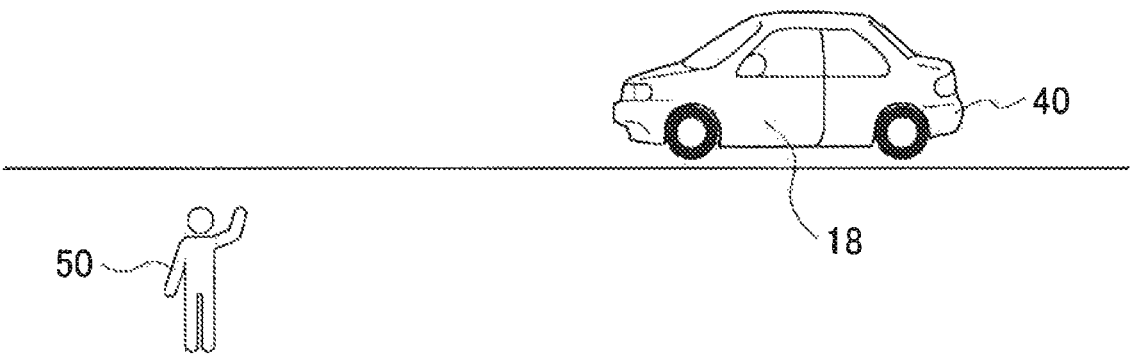
FIG. 2 is a diagram describing one example of a prescribed movement of a user.

When detecting movement of a pedestrian, the detection unit 22 determines whether the movement is a prescribed movement. One example of a prescribed movement is that of a pedestrian raising his or her hand. More specifically, a pedestrian raising his or her hand is a movement in which a pedestrian 50 is raising a hand toward an autonomous driving vehicle 40, as shown in FIG. 2. Pattern matching is used as the determination method. The movement of raising a hand toward the autonomous driving vehicle 40 is preregistered in the storage device 13 as learning data. The learning data include a wide range of hand-raising data categorized by gender, age, height, weight, etc., so as to accommodate a variety of pedestrians. The detection unit 22 compares the movement of the pedestrian 50 and the learning data, and determines whether the movement of the pedestrian 50 matches or is similar to the learning data. When the movement of the pedestrian 50 matches or is similar to the learning data, the detection unit 22 determines that the pedestrian 50 is raising a hand toward the autonomous driving vehicle 40. In addition to the hand-raising of the pedestrian 50, the detection unit 22 may consider the orientation of the pedestrian's 50 face, body, palm, and the like, as the movement of the pedestrian 50, to determine whether the pedestrian 50 is raising a hand toward the autonomous driving vehicle 40. In this case, movements such as the pedestrian 50 orienting the face, body, or palm toward the autonomous driving vehicle 40, should be preregistered in the storage device 13 as the learning data. If the movement of the pedestrian 50 (the pedestrian 50 orienting the face, body, or palm toward the autonomous driving vehicle 40, or raising a hand) matches or is similar to the learning data, the detection unit 22 may determine that the pedestrian 50 is raising a hand toward the autonomous driving vehicle 40.

If it is determined that the pedestrian 50 is raising a hand toward the autonomous driving vehicle 40, the detection unit 22 detects the pedestrian 50 as a prospective passenger 50 who desires to board the autonomous driving vehicle 40. The prescribed movement is described above as the hand-raising of the pedestrian 50, but no limitation is imposed thereby. The prescribed movement may be any movement as long as it is possible to determine the pedestrian's 50 desire to board or the signal to board. For example, the prescribed movement maybe a movement in which the pedestrian 50 points a finger at the autonomous driving vehicle 40. The boarding permission determination device 1 according to the present embodiment is used for boarding the prospective passenger 50 onto the autonomous driving vehicle 40 when the detection unit 22 detects the pedestrian 50 to be the prospective passenger 50.

In addition, when detecting the prospective passenger 50, the detection unit 22 registers information indicating the characteristics of the prospective passenger 50 in the storage device 13. Information indicating the characteristics of the prospective passenger 50 is time-series data of objects that indicate the characteristics of the prospective passenger 50 described above. Typically, these are time-series data of facial images of the prospective passenger 50. However, information indicating the characteristics of the prospective passenger 50 is not limited thereto. The information indicating the characteristics of the prospective passenger 50 may include clothing, height, the presence/absence of a companions, and the like. The clothing and height of the prospective passenger 50 are acquired by carrying out edge detection processing of an image. In terms of the presence/absence of a companion, when a person is detected near the prospective passenger 50 by means of pattern matching processing of an image, the person is acquired as a companion. In addition, the information indicating the characteristics of the prospective passenger 50 may include location information of the prospective passenger 50. The location information of the prospective passenger 50 is obtained as follows. Images acquired by the sensor 10 include the location information (latitude information, longitude information, direction information) of the sensor 10. The distance from the sensor 10 to the prospective passenger 50 can be obtained by means of image processing utilizing parallax between two images, for example. Thus, the location information of the prospective passenger 50 is calculated based on the location information of the sensor 10 and the distance from the sensor 10 to the prospective passenger 50. The distance from the sensor 10 to the prospective passenger 50 may also be acquired from LiDAR data, or the like.

Figure 3:
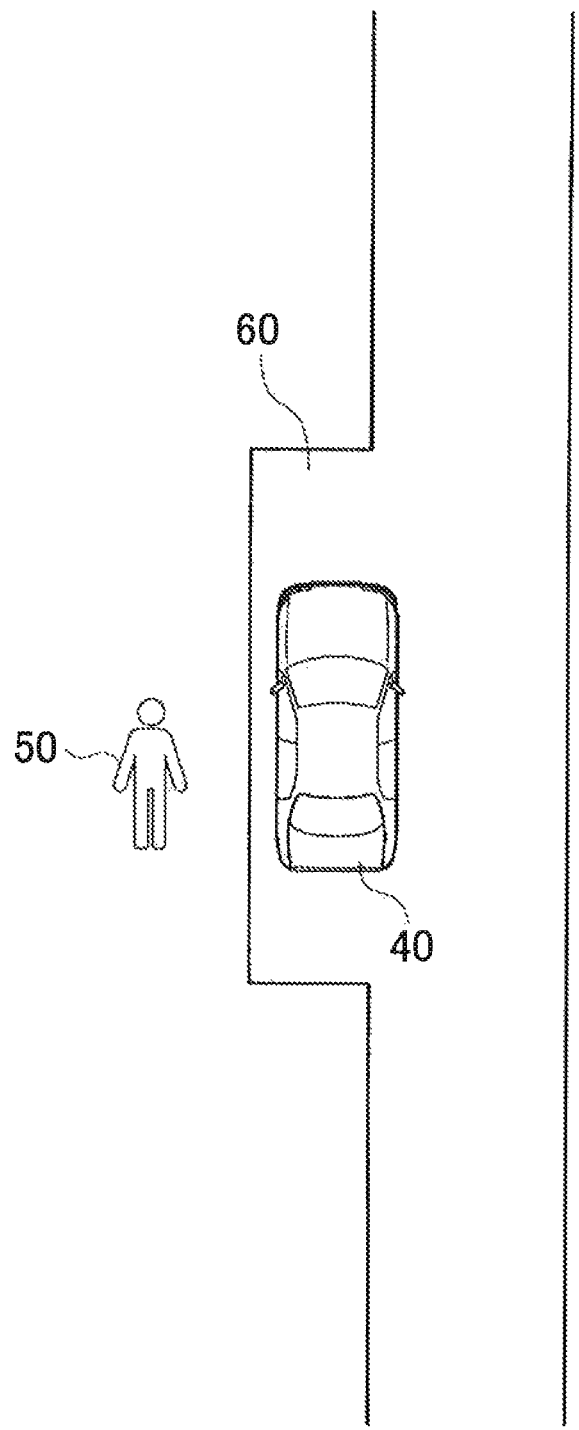
FIG. 3 is a diagram describing one example of a stop location.

When the detection unit 22 detects the prospective passenger 50 around the autonomous driving vehicle 40 while the autonomous driving vehicle 40 is traveling, the stop location detection unit 23 determines a place where the autonomous driving vehicle 40 can safely stop (hereinafter may be simply referred to as a stop location). As an example, the stop location detection unit 23 refers to a map database 13*a* stored in the storage device 13 to determine the stop location. The map database 13*a* stores places where the autonomous driving vehicle 40 can safely stop. Stop locations include roadside areas, predetermined stopping-only spaces, and the like. As shown in FIG. 3, if there is a stopping-only space 60 near the prospective passenger 50, the autonomous driving vehicle 40 stops in the stopping-only space 60. The map database 13*a* may store places where the autonomous driving vehicle 40 cannot stop. In this case, the boarding permission determination device 1 recognizes places that exclude those where vehicles cannot stop as places where the autonomous driving vehicle 40 can safely stop. Locations where vehicles cannot stop include places where stopping is prohibited by law, such as around intersections, pedestrian crossings, railroad crossings, and the like.

In addition, the map database 13*a* store various data required for autonomous driving travel such as road information and facility information. Road information includes information such as the number of lanes on a road, road boundaries, and the like. The map database 13*a* outputs map information to the controller 20 in accordance with a request from the controller 20. Various data such as road information are not necessarily limited to data acquired from the map database 13*a*, and may be acquired by the sensor 10, or acquired using vehicle-to-vehicle communication or road-to-vehicle communication. In addition, if various data such as road information are stored in an externally installed server, the controller 20 may acquire these data from the server at any time by means of communication. In addition, the controller 20 may periodically acquire the latest map information from an externally installed server and update the map information in its possession.

The stop location detection unit 23 may determine the stop location based on the above-described location information of the prospective passenger 50. Stopping the autonomous driving vehicle 40 near the prospective passenger 50 enhances user convenience for the prospective passenger 50.

The route setting unit 24 sets a route on which the autonomous driving vehicle 40 may make rounds. In addition, when the stop location detection unit 23 determines the stop location, the route setting unit 24 changes the route on which to make rounds, and sets a new route to the stop location. For example, the route setting unit 24 references the map database 13*a* and sets a new, shortest route from the current location to the stop location. The route setting unit 24 may set a new, shortest route from the current location to the stop location while taking into consideration traffic conditions, etc.

Figure 4:
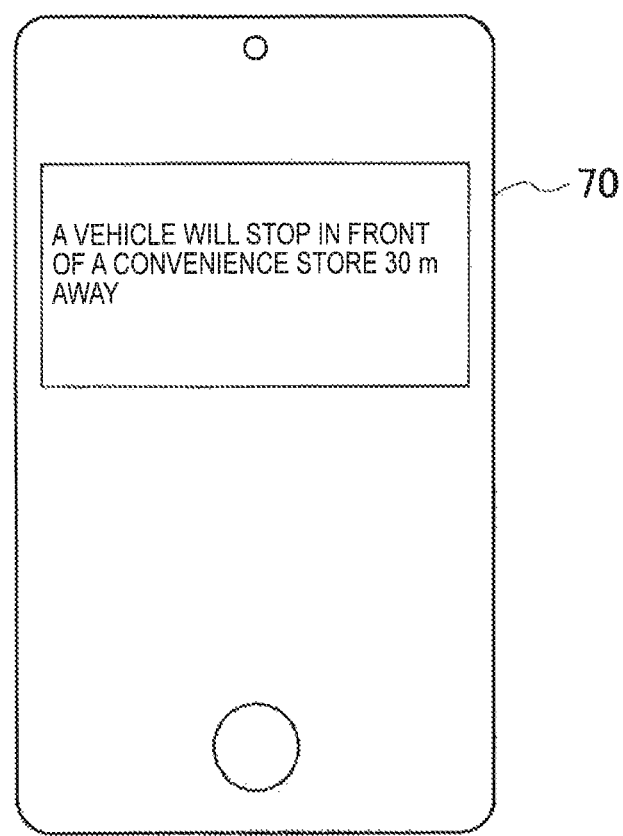
FIG. 4 is a diagram describing one example of a message that is displayed on a user's mobile terminal.

The guide unit 25 guides the prospective passenger 50 to the stop location. For example, the guide unit 25 displays the message "a vehicle will stop in front of the convenience store 30 m away" on the display 15. The prospective passenger 50 who sees the message on the display 15 can confirm the stop location of the autonomous driving vehicle 40 at a glance. In addition, the guide unit 25 may report the stop location to a mobile terminal (such as a smartphone) in the possession of the prospective passenger 50. As shown in FIG. 4, as a result of the message "a vehicle will stop in front of a convenience store 30 m away" being displayed on a mobile terminal 70, the prospective passenger 50 can confirm the stop location of the autonomous driving vehicle 40 at a glance. An example of a method for reporting the message to the mobile terminal 70 is a method that uses an E-mail address of the prospective passenger 50 that has been registered as a member in advance. If facial image information is included in the information related to member registration, the guide unit 25 extracts, from a database related to member registration, facial image information that matches or is similar to the facial image information of the prospective passenger 50 detected by the detection unit 22. Then, the guide unit 25 transmits a message to an E-mail address associated with the extracted facial image information. It is thereby possible to send a message to the mobile terminal 70.

The speed calculation unit 26 calculates the time required for the prospective passenger 50 to walk to the stop location from the place where the hand-raising of the prospective passenger 50 is detected. Hereinbelow, such a time may be simply referred to as the estimated arrival time. The estimated arrival time is calculated by dividing the distance from the place where the hand-raising of the prospective passenger 50 is detected to the stop location by the walking speed of the prospective passenger 50. The distance from the place where the hand-raising of the prospective passenger 50 is calculated based on the place where the hand-raising of the prospective passenger 50 is detected and the location information of the stop location. The location information of the place where the hand-raising of the prospective passenger 50 is detected is acquired by means of the above-described method. The location information of the stop location is stored in the map database 13a. The walking speed of the prospective passenger 50 is obtained by dividing changes in the location information of the prospective passenger 50 between images by time. The estimated arrival time calculated in this manner is used to cancel the boarding of the prospective passenger 50. The speed calculation unit 26 compares the time that has elapsed in a state in which the prospective passenger 50 cannot be recognized after the autonomous driving vehicle 40 stops at the stop location (hereinafter sometimes referred to simply as elapsed time) and the calculated estimated arrival time +α. When the time that has elapsed in a state in which the prospective passenger 50 cannot be recognized exceeds the estimated arrival time +α, the speed calculation unit 26 determines that boarding has been canceled. If the boarding has been canceled, since keeping the autonomous driving vehicle 40 stopped is a waste of time, the vehicle control unit 29 causes the autonomous driving vehicle 40 to start traveling. It is thereby possible to reduce wasteful standby time of the autonomous driving vehicle 40. The value of α, which is added to the estimated arrival time, can be appropriately changed in accordance with certain attributes (for example, height) of the prospective passenger 50. In addition, the value of α may be zero.

The recognition unit 27 recognizes the prospective passenger 50 detected while the autonomous driving vehicle 40 was traveling after the autonomous driving vehicle 40 stops at the stop location. Specifically, the recognition unit 27 first detects pedestrians around the stop location using the sensor 10. Then, the recognition unit 27 detects information associated with the pedestrians, such as the pedestrians' faces, clothes, heights, presence/absence of companions, and the like. The reason for detecting pedestrians around the stop location is because it is assumed that pedestrians around the stop location would include the prospective passenger 50. Around the stop location means, for example, within a 5 m radius around the stop location. If a pedestrian is detected around the stop location, the recognition unit 27 compares the information associated with the detected pedestrian and the information associated with the prospective passenger 50 registered in the storage device 13 to determine whether the information associated with the pedestrian matches or is similar to the information associated with the prospective passenger 50. For example, the recognition unit 27 determines whether the facial image of the pedestrian matches or is similar to the facial image of the prospective passenger 50. If the facial image of the pedestrian matches or is similar to the facial image of the prospective passenger 50, the recognition unit 27 recognizes the pedestrian as the prospective passenger 50. Of course, in addition to the facial image of the prospective passenger 50, the recognition unit 27 may carry out the above-described determination by comparing the clothes, heights, presence/absence of companions, etc., of both the pedestrian and the prospective passenger 50 registered in the storage device 13.

The door control unit 28 controls the locking (lock) and releasing of the lock of the door 18 of the autonomous driving vehicle 40, and the opening/closing of the door 18. When the recognition unit 27 recognizes the prospective passenger 50, the door control unit 28 releases the door lock, which is the locking device of the door 18. As a result, the prospective passenger 50 can open and close the door 18, so that the prospective passenger 50 can open the door 18 and board the autonomous driving vehicle 40. In addition, the door control unit 28 may control an opening/closing device of the door 18 such that the door 18 opens automatically after the door lock is released. As a result, the prospective passenger 50 can board the autonomous driving vehicle 40 without touching the door 18. The automatic opening and closing of the door 18 is carried out such that no danger is posed to the prospective passenger 50. For example, when automatic opening and closing of the door 18 is carried out, the door control unit 28 uses the speaker 14 to announce "The door is opening. Please stay clear of the door," to the prospective passenger 50.

In addition, the door control unit 28 may switch the authentication device 16 installed outside of the vehicle (outer side) of the autonomous driving vehicle 40 from an inactive state to an active state. The authentication device 16 is, for example, a touch panel type device, which can carry out authentication or payment using a contactless IC card, or the like. Authentication or payment using a contactless IC card, or the like, will be described. When the door control unit 28 switches the authentication device 16 from the inactive state to the active state, recognition of the prospective passenger 50 by the recognition unit 27 is already complete, so that an authentication using a contactless IC card, or the like, means the final confirmation of the intention to board. Payment using a contactless IC card, or the like, means advance payment. An inactive state is a state in which a contactless IC card, or the like, does not respond. On the other hand, an active state is a state in which a contactless IC card, or the like, does respond. When the recognition unit 27 completes recognition of the prospective passenger 50, the door control unit 28 switches the authentication device 16 from the inactive state to the active state. As a result, the prospective passenger 50 can smoothly carry out authentication or payment using a contactless IC card, or the like. When the authentication device 16 completes authentication or payment, the door control unit 28 releases the door lock. The prospective passenger 50 can thereby board the autonomous driving vehicle 40.

The vehicle control unit 29 controls a brake actuator, an accelerator pedal actuator, a steering actuator, and the like, based on information acquired by the sensor 10, such that the autonomous driving vehicle 40 travels along a route set by the route setting unit 24. As a result, autonomous driving is realized.

Figure 5:
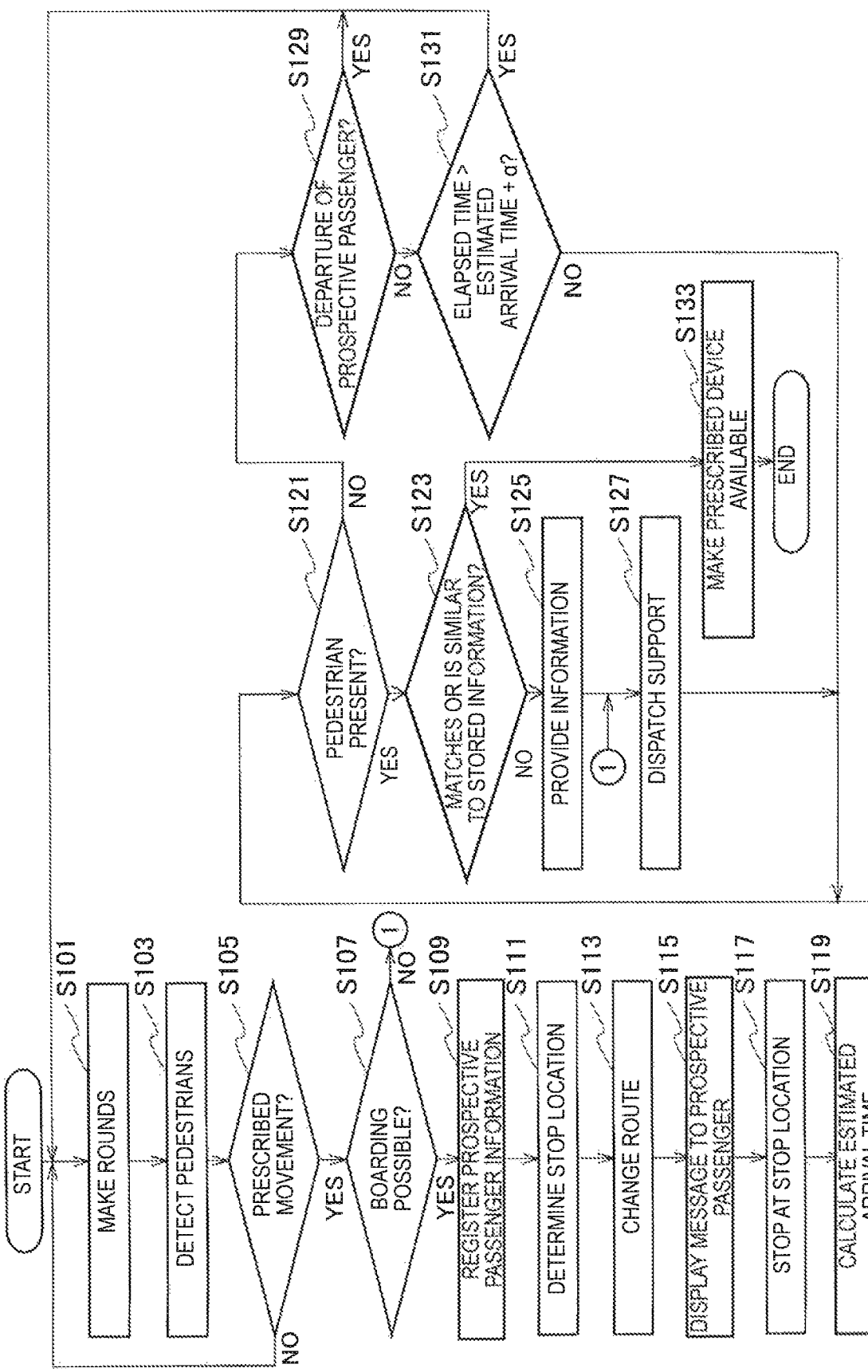
FIG. 5 is a flowchart describing one operation example of the boarding permission determination device according to the first embodiment of the present invention.

Next, one operation example of the boarding permission determination device 1 will be described with reference to the flow chart of FIG. 5.

In Step S101, the autonomous driving vehicle 40 makes rounds along a preset route. The preset route may be a route set by the route setting unit 24, or a route set by a data center.

When the autonomous driving vehicle 40 is making rounds along a preset route, the detection unit 22 uses the sensor 10 to detect pedestrians (Step S103). The detection unit 22 determines whether the movement of a detected pedestrian is a prescribed movement. Specifically, the detection unit 22 determines whether a pedestrian is raising a hand toward the autonomous driving vehicle 40. When the movement of the pedestrian 50 matches or is similar to the learning data registered in the storage device 13, the detection unit 22 determines that the pedestrian 50 is raising a hand toward the autonomous driving vehicle 40 (Yes in Step S105). At this time, the detection unit 22 detects the pedestrian 50 as the prospective passenger 50 who desires to board the autonomous driving vehicle 40. On the other hand, when the movement of the pedestrian is not the prescribed movement (No in Step S105), the process returns to Step S101.

The process proceeds to Step S107, and the guide unit 25 determines whether the prospective passenger 50 may board. If the autonomous driving vehicle 40 is reserved by another user different from the prospective passenger 50, the prospective passenger 50 may not board. In this case (No in Step S107), the process proceeds to Step S127, and the guide unit 25 dispatches another vehicle. Specifically, the guide unit 25 transmits the current location information pertaining to the autonomous driving vehicle 40 to another vehicle, and instructs the other vehicle to come to the current location of the autonomous driving vehicle 40. In this manner, the guide unit 25 has a function for carrying out a dispatch service to the prospective passenger 50. As a result, the prospective passenger 50 can board another vehicle without searching for another vehicle. Communication between the autonomous driving vehicle 40 and the other vehicle may be carried out directly or via a data center. In addition, the other vehicle may be a robot taxi, like the autonomous driving vehicle 40, or an ordinary taxi. The Internet may be used for the communication between the autonomous driving vehicle 40 and the other vehicle. There are cases in which the autonomous driving vehicle 40 cannot board the prospective passenger 50, even if it is not reserved. For example, if the timing of the hand-raising of the prospective passenger 50 is immediately before the autonomous driving vehicle 40 passes the prospective passenger 50, the autonomous driving vehicle 40 cannot smoothly stop and thus cannot board the prospective passenger 50. In this case as well, the guide unit 25 can dispatch another vehicle. As a result, the prospective passenger 50 can board another vehicle without searching for one.

If the prospective passenger 50 can board (Yes in Step S107), the detection unit 22 registers information indicating the characteristics of the prospective passenger 50 in the storage device 13. The information indicating the characteristics of the prospective passenger 50 includes the pedestrian's 50 facial image, clothing, height, and presence/absence of a companion, detected by the sensor 10, as described above, the location information of the prospective passenger 50, and the like.

The process proceeds to Step S111, and the stop location detection unit 23 references the map database 13a to find a stop location where the autonomous driving vehicle 40 can safely stop. The process proceeds to Step S113, the route setting unit 24 changes the route for making rounds, and sets a new route to the stop location determined by the stop location detection unit 23.

The process proceeds to Step S115, and the guide unit 25 displays a message for notifying the prospective passenger 50 of the stop location. For example, the guide unit 25 displays the message "a vehicle will stop in front of a convenience store 30 m away" on the display 15. In addition, the guide unit 25 may send the stop location to the mobile terminal 70 in the possession of the prospective passenger 50 (refer to FIG. 4). The prospective passenger 50 who sees the message on the display 15 or the mobile terminal 70 can confirm the stop location of the autonomous driving vehicle 40 at a glance.

The process proceeds to Step S117, and the vehicle control unit 29 causes the autonomous driving vehicle 40 to travel along the route newly set in Step S113, and causes the autonomous driving vehicle 40 to stop at the stop location.

Thereafter, the process proceeds to Step S119, and the speed calculation unit 26 calculates the estimated arrival time required for the prospective passenger 50 to walk to the stop location from the place where the hand-raising of the prospective passenger 50 is detected.

The process proceeds to Step S121, and the recognition unit 27 detects pedestrians around the stop location using the sensor 10. The reason for detecting pedestrians around the stop location is because it is assumed that pedestrians around the stop location would include the prospective passenger 50. If a pedestrian is detected around the stop location (Yes in Step S121), the recognition unit 27 compares the information associated with the detected pedestrian and the information associated with the prospective passenger 50 registered in the storage device 13 to determine whether the information associated with the pedestrian matches or is similar to information associated with the prospective passenger 50. For example, the recognition unit 27 determines whether the facial image of the pedestrian matches or is similar to the facial image of the prospective passenger 50. If the facial image of the pedestrian matches or is similar to the facial image of the prospective passenger 50, the recognition unit 27 recognizes the pedestrian as the prospective passenger 50. Of course, in addition to the facial image of the prospective passenger 50, the recognition unit 27 may carry out the above-described determination by comparing the clothes, heights, presence/absence of companions, etc., of both the pedestrian. and the prospective passenger 50 registered in the storage device 13.

If the recognition unit 27 recognizes a pedestrian around the stop location as the prospective passenger 50 (Yes in Step S123), the process proceeds to Step S133, and the door control unit 28 controls prescribed devices mounted on the autonomous driving vehicle 40 so as to allow use by the prospective passenger 50. In other words, the door control unit 28 controls the prescribed devices mounted on the autonomous driving vehicle 40 such that the prospective passenger 50 can board the autonomous driving vehicle 40. A prescribed device is, for example, an opening/closing device or a locking device of the door 18. The opening/closing device of the door 18 may also be designated as a door opening/closing control device that controls the opening/closing of the door 18. In addition, the locking device of the door 18 may be designated as a door lock control device that controls the locking and unlocking of the door 18. In Step S133, the door control unit 28 releases the door lock, which is the locking device of the door 18. As a result, the prospective passenger 50 can open and close the door 18, so that the prospective passenger 50 can open the door 18 and board the autonomous driving vehicle 40. In addition, the door control unit 28 may control an opening/closing device of the door 18 such that the door 18 opens automatically after the door lock is released. As a result, the prospective passenger 50 can board the autonomous driving vehicle 40 without touching the door 18. In addition, prescribed devices include the authentication device 16. The door control unit 28 may switch the authentication device 16 installed outside of the vehicle (outside) of the autonomous driving vehicle 40 from the inactive state to the active state. As a result, the prospective passenger 50 can smoothly carry out authentication or payment using a contactless IC card, or the like. When the authentication device 16 completes authentication or payment, the door control unit 28 releases the door lock. The prospective passenger 50 can thereby board the autonomous driving vehicle 40.

In Step S121, if a pedestrian is not detected around the stop location after the autonomous driving vehicle 40 stops at the stop location (No in Step S121), the process proceeds to Step S129, and the recognition unit 27 determines whether the prospective passenger 50 has departed. That the prospective passenger 50 has departed means that the prospective passenger 50 is moving away from the autonomous driving vehicle 40. If the prospective passenger 50 is moving away from the autonomous driving vehicle 40, it can be assumed that the prospective passenger 50 does not intend to board. Thus, in the present embodiment, the departure of the prospective passenger 50 is equivalent to a boarding cancellation. If the distance between the prospective passenger 50 and the autonomous driving vehicle 40 increases over time after the autonomous driving vehicle 40 stops at the stop location, the recognition unit 27 determines that the prospective passenger 50 has departed. The process of Step S129 occurs when the prospective passenger 50 detected in Step S105 is continuously detected by the sensor 10 but is not near the stop location. The distance between the prospective passenger 50 and the autonomous driving vehicle 40 is the distance from the sensor 10 to the prospective passenger 50, and such a distance can be obtained by means of image processing utilizing parallax between two images. If the distance between the prospective passenger 50 and the autonomous driving vehicle 40 increases over time, it means that the prospective passenger 50 has continued to move away from the autonomous driving vehicle 40 for a prescribed period of time, or that the prospective passenger 50 has moved away from the autonomous driving vehicle 40 by a prescribed distance. If it is determined that the prospective passenger 50 has departed (Yes in Step S129), that is, if boarding has been canceled, keeping the autonomous driving vehicle 40 stopped is a waste of time. Thus, in this ease, the process returns to Step S101, and the vehicle control unit 29 causes the autonomous driving vehicle 40 to start traveling. It is thereby possible to reduce wasteful standby time of the autonomous driving vehicle 40.

If a departure of the prospective passenger 50 is not detected (No in Step S129), the process proceeds to Step S131. In Step S131, the speed calculation unit 26 compares the time that has elapsed in a state in which the prospective passenger 50 cannot be recognized after the autonomous driving vehicle 40 stops at the stop location and the estimated arrival time calculated in Step S119. More specifically, the speed calculation unit 26 compares the elapsed time and the estimated arrival time +α. When the time that has elapsed in a state in which the prospective passenger 50 cannot be recognized exceeds the estimated arrival time +α (Yes in Step S131), the speed calculation unit 26 determines that boarding has been canceled. This is because it is assumed that the prospective passenger 50 does not intend to board. If the boarding has been canceled, keeping the autonomous driving vehicle 40 stopped is a waste of time. Thus, in this ease, the process returns to Step S101, and the vehicle control unit 29 causes the autonomous driving vehicle 40 to start traveling. It is thereby possible to reduce wasteful standby time of the autonomous driving vehicle 40.

In Step S123, if the information associated with the pedestrian does not match or is not similar to information associated with the prospective passenger 50 (No in Step S123), another person besides the prospective passenger 50 may board the autonomous driving vehicle 40. However, even if a different person than the prospective passenger 50 attempts to board the autonomous driving vehicle 40, the door lock will not be released and the different person than the prospective passenger 50 cannot board the autonomous driving vehicle 40. Therefore, if a different person than the prospective passenger 50 is detected around the stop location and it is detected that this different person than the prospective passenger 50 has operated the door 18 in order to board the autonomous driving vehicle 40, the guide unit 25 notifies the different person than the prospective passenger 50 by audible or visual means that the autonomous driving vehicle 40 has already been reserved. As a result, the different person than the prospective passenger 50 can know that it is not possible to board the autonomous driving vehicle 40, which does not inconvenience the person that is different than the prospective passenger 50.

In Step S123, the guide unit 25 may propose to dispatch a different vehicle for this different person than the prospective passenger 50. For example, the controller 20 may display on the display 15 "Would you like a vehicle dispatched to the current location?" and request a vehicle to be dispatched to the different person than the prospective passenger 50. If the different person than the prospective passenger 50 operates the display 15 and wants a vehicle to be dispatched, the controller 20 transmits information related to the current location of the autonomous driving vehicle 40 to another vehicle, and instructs the other vehicle to come to the current location of the autonomous driving vehicle 40. As a result, the different person than the prospective passenger 50 can board another vehicle, which does not inconvenience the person who is not the prospective passenger 50.

As described above, the following actions and effects can be achieved by means of the boarding permission determination device 1 according to the first embodiment.

The boarding permission determination device 1 comprises the controller 20 that uses the sensor 10 mounted on a vehicle (autonomous driving vehicle 40) to detect at least a prescribed movement of a person in the periphery of the autonomous driving vehicle 40 while the autonomous driving vehicle 40 is traveling. One example of a prescribed movement is a person raising his or her hand, as described above. When the prescribed movement of a person while the autonomous driving vehicle 40 is traveling is detected, the controller 20 detects the person as a prospective passenger 50 who desires to board the autonomous driving vehicle 40. After detecting the prospective passenger 50, the controller 20 determines a stop location of the autonomous driving vehicle 40. The controller 20 uses various actuators to control the autonomous driving vehicle 40 such that the autonomous driving vehicle 40 stops at the determined stop location. After the autonomous driving vehicle 40 is stopped at the stop location and the prospective passenger 50 that was detected while the autonomous driving vehicle 40 was traveling is recognized, the controller 20 controls prescribed devices mounted on the autonomous driving vehicle 40 to allow the prospective passenger 50 to board the autonomous driving vehicle 40. A prescribed device is, for example, an opening/closing device or a locking device of the door 18. The opening/closing device of the door 18 may also be designated as a door opening/closing control device that controls the opening/closing of the door 18. In addition, the locking device of the door 18 may be designated as a door lock control device that controls the locking and unlocking of the door 18. When the prospective passenger 50 is recognized as such by the controller 20, the controller releases the door lock, which is the locking device of the door 18. As a result, the prospective passenger 50 can open and close the door 18, so that the prospective passenger 50 may open the door 18 and board the autonomous driving vehicle 40. In addition, the controller 20 may control an opening/closing device of the door 18 such that the door 18 opens automatically after the door lock is released. As a result, the prospective passenger 50 can board the autonomous driving vehicle 40 without touching the door 18. In addition, prescribed devices include the authentication device 16 installed outside of the vehicle (outside) of the autonomous driving vehicle 40. When the controller 20 recognizes the prospective passenger 50, the controller may switch the authentication device 16 from the inactive state to the active state. As a result, the prospective passenger 50 can smoothly carry out an authorization or payment using a contactless IC card, or the like. After the authentication device 16 completes the authorization or payment, the controller 20 releases the door lock. The prospective passenger 50 can in this way board the autonomous driving vehicle 40. Thus, by means of the boarding permission determination device 1, it becomes possible for the prospective passenger 50 who signals his or her intention to board the autonomous driving vehicle 40 to do so. In other words, a different person than the prospective passenger 50 but who has signaled an intention to board the autonomous driving vehicle 40 is prevented from mistakenly doing so.

Further, when detecting the prescribed movement of the prospective passenger 50 while the autonomous driving vehicle 40 is traveling, the controller 20 registers information indicating the characteristics of the prospective passenger 50 in the storage device 13. The information indicating the characteristics of the prospective passenger 50 is, as described above, the prospective passenger's 50 facial image, clothing, height, and the presence/absence of a companion, the location information of the prospective passenger 50, and the like. The prospective passenger 50 that was detected while the autonomous driving vehicle 40 was traveling using the information registered in the storage device 13 is recognized by the controller 20 after the autonomous driving vehicle 40 has stopped at the stop location. Specifically, the controller 20 causes the autonomous driving vehicle 40 to stop at the stop location, and then detects pedestrians around the stop location by means of the sensor 10. When a pedestrian is detected, the controller 20 compares information (for example, a facial image) associated with the detected pedestrian with information (for example, a facial image) associated with the prospective passenger 50 registered in the storage device 13 to determine whether the information associated with the pedestrian matches or is similar to information associated with the prospective passenger 50. If the facial image of the pedestrian matches or is similar to the facial image of the prospective passenger 50, the controller 20 recognizes the pedestrian as the prospective passenger 50. In this manner, by comparing the information indicating the characteristics of the prospective passenger 50 detected while the autonomous driving vehicle 40 was traveling with the information associated with the pedestrian detected while the autonomous driving vehicle 40 was stopped at the stop location, the controller 20 can accurately recognize the prospective passenger 50 detected while the autonomous driving vehicle 40 was traveling at the stop location.

Further, when the prospective passenger 50 detected while the autonomous driving vehicle 40 was traveling cannot be recognized after a prescribed period of time after the autonomous driving vehicle 40 has come to a stop at the stop location, the controller 20 causes the autonomous driving vehicle 40 to start traveling without boarding the prospective passenger 50. Specifically, the controller 20 compares the time that has elapsed in a state in which the prospective passenger 50 cannot be recognized after the autonomous driving vehicle 40 is stopped at the stop location with the estimated arrival time +α. When the time that has elapsed in a state in which the prospective passenger 50 cannot be recognized exceeds the estimated arrival time +α, the controller 20 determines that the boarding has been canceled. If the boarding has been canceled, keeping the autonomous driving vehicle 40 stopped is a waste of time. Thus, the controller 20 causes the autonomous driving vehicle 40 to start traveling. It is thereby possible to reduce wasteful standby time of the autonomous driving vehicle 40. The prescribed period of time corresponds to the estimated arrival time +α.

In addition, when the distance between the prospective passenger 50 detected while the autonomous driving vehicle 40 was traveling and the autonomous driving vehicle 40 increases over time after the autonomous driving vehicle 40 is stopped at the stop location, the controller 20 causes the autonomous driving vehicle 40 to start traveling without boarding the prospective passenger 50. If the distance between the prospective passenger 50 and the autonomous driving vehicle 40 increases over time, this means that the prospective passenger 50 has canceled the boarding, as described above. If the boarding has been canceled, keeping the autonomous driving vehicle 40 stopped is a waste of time. Therefore, the controller 20 causes the autonomous driving vehicle 40 to start traveling. It is thus possible to reduce wasteful standby time of the autonomous driving vehicle 40.

In addition, when it is detected that a person (second person) who is not the prospective passenger 50 that was detected while the autonomous driving vehicle 40 was traveling has operated a prescribed device after the autonomous driving vehicle 40 is stopped at the stop location, the controller 20 notifies the different person than the prospective passenger 50 by audible or visual means that the autonomous driving vehicle 40 has already been reserved. Since the autonomous driving vehicle 40 is a taxi, a different person than the prospective passenger 50 may board the autonomous driving vehicle 40. However, because the autonomous driving vehicle 40 has been reserved by the prospective passenger 50, a different person than the prospective passenger 50 cannot board. Therefore, if a different person than the prospective passenger 50 is detected around the stop location and it is detected that the different person than the prospective passenger 50 has operated the door 18 in order to board the autonomous driving vehicle 40, the controller 20 notifies the different person than the prospective passenger 50 by means of voice or an image that the autonomous driving vehicle 40 has already been reserved. As a result, the different person than the prospective passenger 50 can understand that it is not possible to board the autonomous driving vehicle 40, which does not inconvenience the different person than the prospective passenger 50.

In addition, when the controller 20 detects a request for the dispatching of a vehicle by the different person than the prospective passenger 50, the controller transmits information relating to the current location of the autonomous driving vehicle 40 to another vehicle, and instructs the other vehicle to come to the current location of the autonomous driving vehicle 40. Although the person different than the prospective passenger 50 may not board the autonomous driving vehicle 40, the person different than the prospective passenger 50 is someone who wants to use a taxi. Thus, in order to confirm the request of the person different than the prospective passenger 50, the controller 20 may display "Would you like a vehicle dispatched to the current location?" on the display 15. If the person different than the prospective passenger 50 operates the display 15 and desires a vehicle to be dispatched, the controller 20 transmits information relating to the current location of the autonomous driving vehicle 40 to another vehicle, and instructs the other vehicle to come to the current location of the autonomous driving vehicle 40. In this manner, the autonomous driving vehicle 40 can provide a dispatch service to a different person than the prospective passenger 50. As a result, the different person than the prospective passenger 50 can board another vehicle without searching for one.

In addition, when the controller 20 detects the prescribed movement of the prospective passenger 50 while the autonomous driving vehicle 40 is traveling, the controller changes the preset route and controls the autonomous driving vehicle 40 such that the autonomous driving vehicle 40 stops at the stop location. Specifically, the controller 20 changes the preset route and finds a new one and sets the route to the stop location. The controller 20 causes the autonomous driving vehicle 40 to travel along the new route. The controller 20 then controls the autonomous driving vehicle 40 such that the autonomous driving vehicle 40 is stopped at the stop location. The autonomous driving vehicle 40 can thus smoothly head to the stop location.

There is a plurality of methods for determining the stop location according to the present embodiment. For example, when the controller 20 detects the prescribed movement of the prospective passenger 50 while the autonomous driving vehicle 40 is traveling, the controller acquires the location information of the prospective passenger 50 or the location information of the autonomous driving vehicle 40. The controller 20 then determines the stop location based on the location information of the prospective passenger 50 or the location information of the autonomous driving vehicle 40. The autonomous driving vehicle 40 can be stopped near the prospective passenger 50 by using the location information of the prospective passenger 50. The convenience of use experienced by the prospective passenger 50 is thereby enhanced. In addition, if the map database 13a is referenced using the location information of the autonomous driving vehicle 40, the stop location can be quickly determined.

In addition, when the controller 20 detects the prescribed movement of the prospective passenger 50 while the autonomous driving vehicle 40 is traveling, the controller sends the stop location to the mobile terminal 70 (for example, a smartphone) in the possession of the prospective passenger 50, or displays the stop location on the display 15 installed in the autonomous driving vehicle 40. For example, the controller 20 sends the mobile terminal 70 the message "a vehicle will stop in front of a convenience store 30 m away." As a result, the prospective passenger 50 can confirm the stop location of the autonomous driving vehicle 40 at a glance.

The controller 20 calculates the time required for the prospective passenger 50 to arrive at the stop location (estimated arrival time) based on the location information of the prospective passenger 50 and the location information of the stop location. After the autonomous driving vehicle 40 has stopped at the stop location, when the amount of time in which it is not possible to recognize the prospective passenger 50 detected while the autonomous driving vehicle 40 was traveling exceeds the estimated arrival time, the controller 20 causes the autonomous driving vehicle 40 to start traveling. The time during which the autonomous driving vehicle 40 cannot recognize the prospective passenger 50 that was detected while the autonomous driving vehicle was traveling is the elapsed time described above. If the time during which the autonomous driving vehicle 40 cannot recognize the prospective passenger 50 that was detected while the autonomous driving vehicle was traveling exceeds the estimated arrival time, this means that the boarding has been canceled. If the boarding has been canceled, keeping the autonomous driving vehicle 40 stopped is a waste of time. Thus, the controller 20 causes the autonomous driving vehicle 40 to start traveling. It is thereby possible to reduce wasteful standby time of the autonomous driving vehicle 40.

Figure 6:
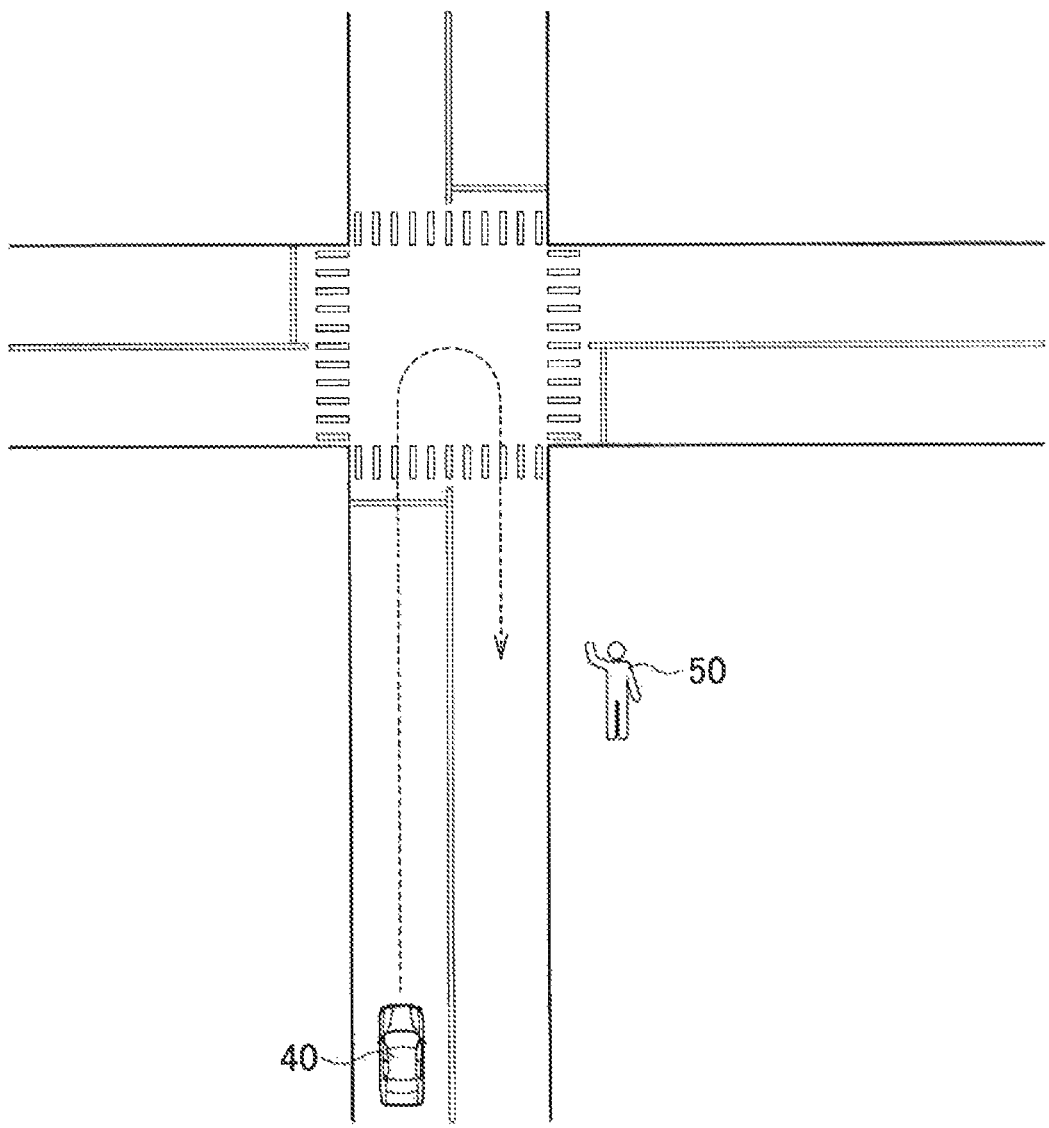
FIG. 6 is a diagram describing one example of the boarding permission determination device according to the first embodiment of the present invention.

As shown in FIG. 6, the boarding permission determination device 1 according to the present embodiment can board the prospective passenger 50 even when the prospective passenger 50 is in the lane on the side opposite to the lane in which the autonomous driving vehicle 40 is traveling.

Second Embodiment

Figure 7:
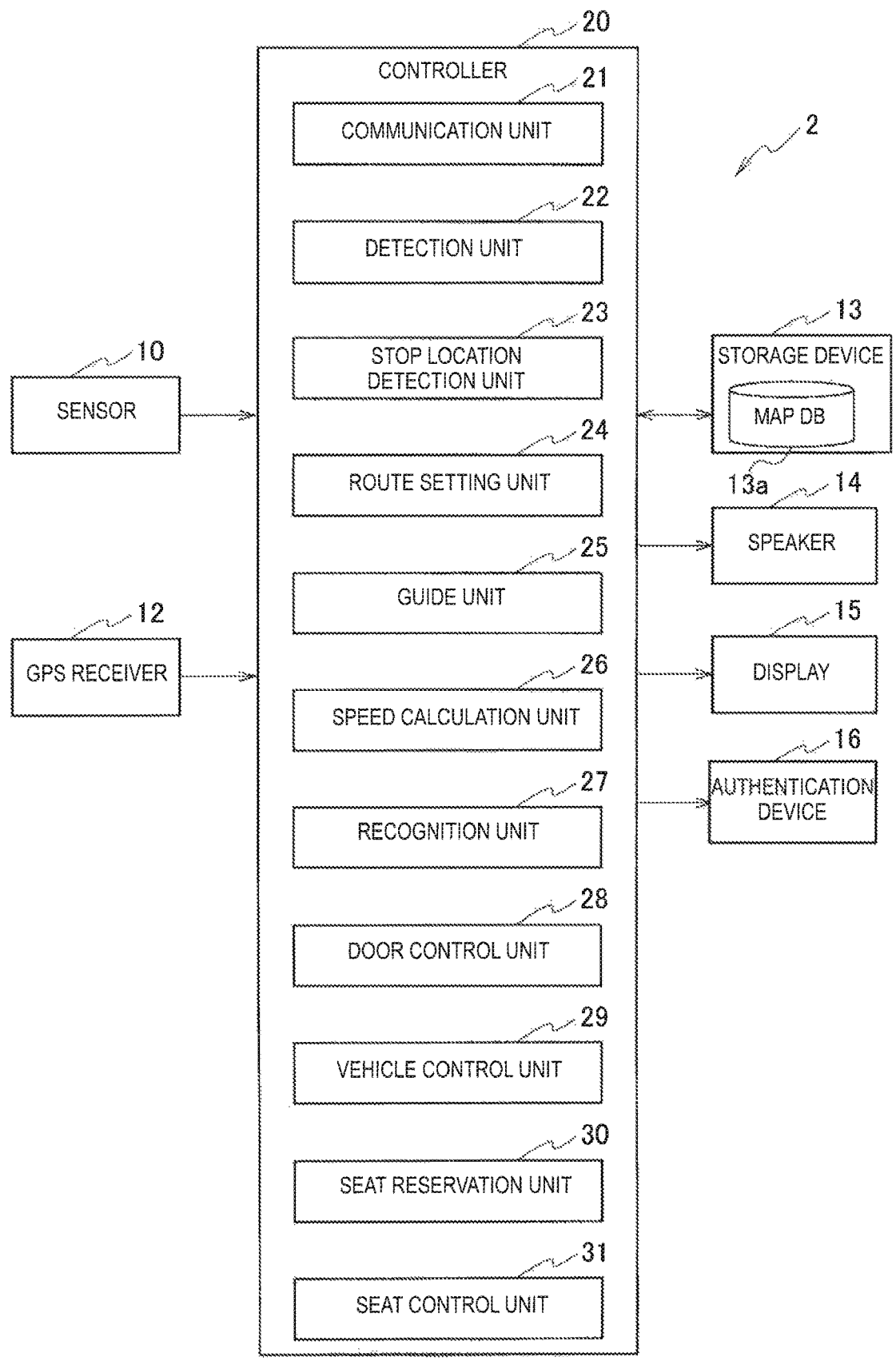
FIG. 7 is a schematic overview of a boarding permission determination device according to a second embodiment of the present invention.

Next a boarding permission determination device 2 according to a second embodiment of the present invention will be described with reference to FIG. 7. The boarding permission determination device 2 according to the second embodiment is different from the boarding permission determination device 1 according to the first embodiment in that the boarding permission determination device 2 comprises a seat reservation unit 30 and a seat control unit 31. The same reference numerals have been used for configurations that overlap the first embodiment, and the descriptions thereof have been omitted. The differences are primarily described below.

In the first embodiment, the driverless autonomous driving vehicle 40 is described as a taxi, but besides taxis, the driverless autonomous driving vehicle 40 includes buses. In the second embodiment, the autonomous driving vehicle 40 is described as a driverless buss.

Since the autonomous driving vehicle 40 is a bus, the number of seats in which users may sit is greater than that of a taxi. However, in a typical bus, if there are many users, the seats will all be taken, and there will be users who cannot be seated. The boarding permission determination device 2 according to the second embodiment is used for the purpose of seating users.

When the detection unit 22 detects the prospective passenger 50 wishing to board the autonomous driving vehicle 40, the seat reservation unit 30 determines whether the prospective passenger 50 is able to board. Being able to board here does not simply mean being able to board the autonomous driving vehicle 40. Being able to board means that there is a vacant seat on the autonomous driving vehicle 40 and that the seat has not been reserved. Even if there is a vacant seat, the seat may have been reserved, and the prospective passenger 50 cannot be seated. Therefore, if there are no vacant seats, or even if there is a vacant seat and that seat has been reserved, the prospective passenger 50 cannot be boarded. In such cases, it is determined that boarding is not possible.

If the prospective passenger 50 can board the autonomous driving vehicle 40, the seat reservation unit 30 reserves a vacant seat for seating the prospective passenger 50. Information relating to the reserved seat may be transmitted to the mobile terminal 70 in the possession of the prospective passenger 50. The same method as the first embodiment is used as the transmission method to the mobile terminal 70. Information relating to the reserved seat includes, for example, a seat number.

In the second embodiment, since the autonomous driving vehicle 40 is a bus, the prospective passenger 50 is not recognized when the prospective passenger 50 boards, unlike in the first embodiment. However, the prospective passenger 50 is recognized when the prospective passenger 50 boards the autonomous driving vehicle 40 and sits in the reserved seat. In the second embodiment, the seating portion of the reserved seat is folded by the seat control unit 31. In the second embodiment, the seat is provided with an elevating device, and the seat control unit 31 controls the elevating device to fold the seating portion of the seat, to lower the folded seating portion, and the like. The reason that the sitting portion of the reserved seat is folded by the seat control unit 31 is to prevent a person different from the prospective passenger 50 from sitting in the reserved seat. In the second embodiment, information indicating the characteristics of the prospective passenger 50, whose hand-raising has been detected, is stored in the storage device 13, in the same manner as the first embodiment. The recognition unit 27 compares the information associated with the prospective passenger 50 that boarded the autonomous driving vehicle 40 with information associated with the prospective passenger 50 registered in the storage device 13 to determine whether the information associated with the prospective passenger 50 that boarded the autonomous driving vehicle 40 matches or is similar to information associated with the prospective passenger 50 registered in the storage device 13. If the information associated with the prospective passenger 50 that boarded the autonomous driving vehicle 40 matches or is similar to the information associated with the prospective passenger 50 registered in the storage device 13, the seat control unit 31 lowers the folded sitting portion. The prospective passenger 50 can thereby sit in the reserved seat. In addition, if the information associated with the prospective passenger 50 that boarded the autonomous driving vehicle 40 matches or is similar to the information associated with the prospective passenger 50 registered in the storage device 13, the seat control unit 31 may switch the authentication device 16 installed near the reserved seat from the inactive state to the active state. The seat control unit 31 may lower the folded sitting portion after the prospective passenger 50 completes authentication or payment by means of the authentication device 16 using a contactless IC card, or the like.

Figure 8:
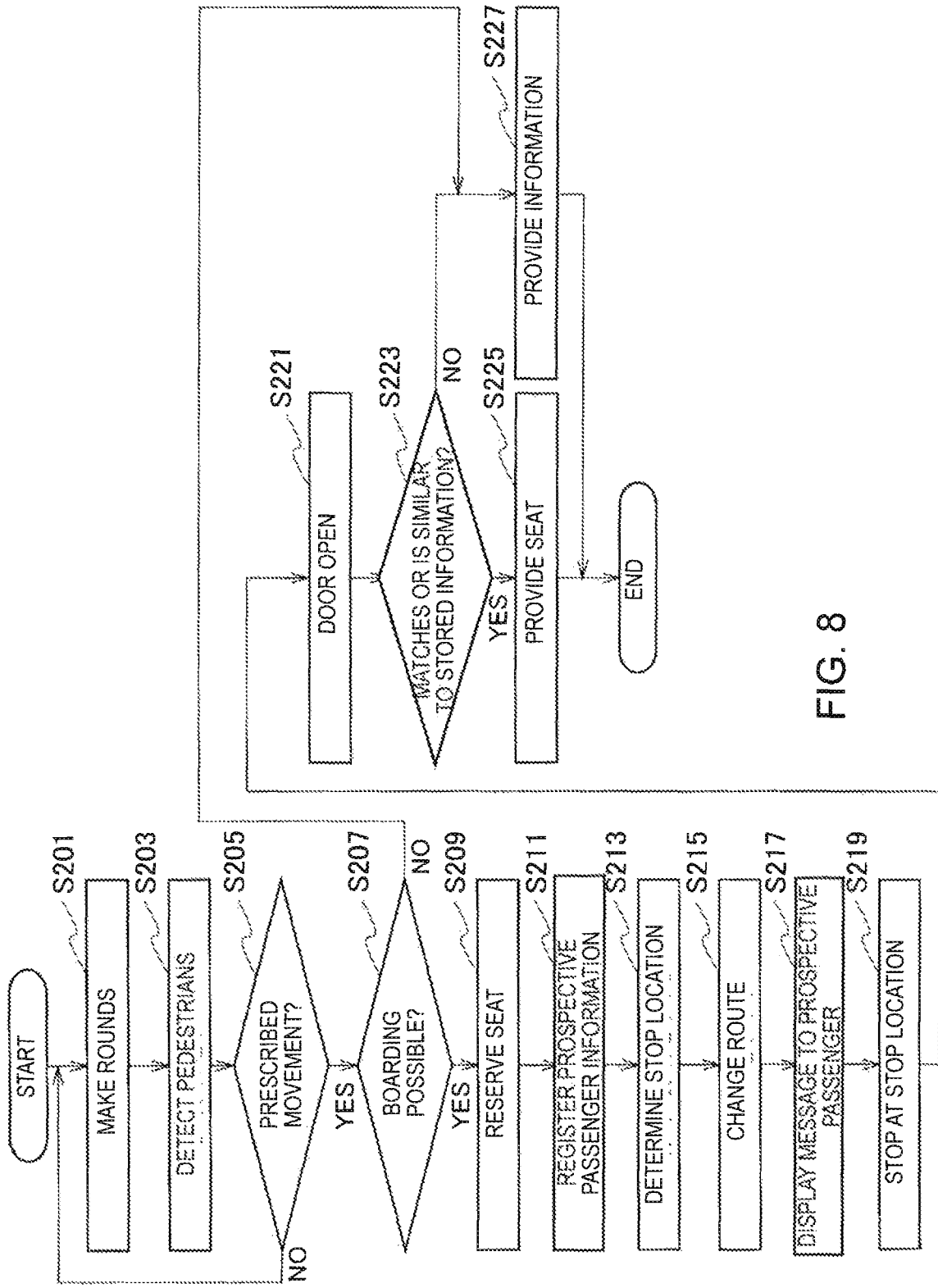
FIG. 8 is a flowchart describing one operation example of the boarding permission determination device according to the second embodiment of the present invention.

Next, one operation example of the boarding permission determination device 2 will be described with reference to the flowchart of FIG. 8. However, Steps S201-205 shown in FIG. 8 are the same as Steps S101-105 shown in FIG. 5, so that the corresponding descriptions will be omitted. In addition, Steps S211-219 shown in FIG. 8 are the same as Steps S109-117 shown in FIG. 5, so that the corresponding descriptions will be omitted.

When the detection unit 22 detects the prospective passenger 50 wishing to board the autonomous driving vehicle 40, in Step S207, the seat reservation unit 30 determines whether the prospective passenger 50 is able to board. If it is determined that boarding is not possible (No in Step S207), the process proceeds to Step S227, and the guide unit 25 uses the display 15, or the like, to notify the prospective passenger 50 that boarding is not possible.

If it is determined that boarding is possible in Step S207 (Yes in Step S207), the process proceeds to Step S209, and the seat reservation unit 30 reserves a vacant seat for seating the prospective passenger 50. Information relating to the reserved seat may be transmitted to the mobile terminal 70 in the possession of the prospective passenger 50. The same method as the first embodiment is used as the transmission method to the mobile terminal 70. The seat information includes, for example, a seat number. The seat control unit 31 controls an elevating device to fold the sitting portion of the reserved seat. This is to prevent a person different than the prospective passenger 50 from sitting in the reserved seat.

Thereafter, in Step S221, the door control unit 28 opens the door 18 and boards the prospective passenger 50. In the second embodiment, since the autonomous driving vehicle 40 is a bus, the prospective passenger 50 is not recognized when the prospective passenger 50 boards, unlike the first embodiment.

The prospective passenger 50 who has boarded the autonomous driving vehicle 40 moves to the reserved seat based on the seat number acquired in Step S209. At the time at which the prospective passenger 50 moves to the reserved seat, the reserved seat is folded and the prospective passenger 50 cannot sit in the reserved seat.

When the prospective passenger 50 moves to the reserved seat, the recognition unit 27 uses the sensor 10 to acquire information associated with the prospective passenger 50. The recognition unit 27 may also acquire information associated with the prospective passenger 50 using the sensor 10 at the time at which the prospective passenger 50 boards the autonomous driving vehicle 40. The sensor 10 of the second embodiment may be installed for each seat or installed in a position overlooking the cabin interior. The recognition unit 27 compares the acquired information (for example, a facial image) associated with the prospective passenger 50 with the information (for example, a facial image) associated with the prospective passenger 50 registered in the storage device 13 to determine whether the prospective passenger 50 that moved to the reserved seat is or resembles the prospective passenger 50 registered in the storage device 13. If the prospective passenger 50 that moved to the reserved seat is or resembles the prospective passenger 50 registered in the storage device 13 (Yes in Step S223), the seat control unit 31 lowers the folded sitting portion (Step S225). The prospective passenger 50 can then sit in the reserved seat.

As described above, the following actions and effects can be achieved by means of the boarding permission determination device 2 according to the second embodiment.

The boarding permission determination device 2 comprises the controller 20 that uses the sensor 10 mounted on the autonomous driving vehicle 40 to detect at least a prescribed movement of a person in the periphery of the autonomous driving vehicle 40 while the autonomous driving vehicle 40 is traveling. One example of a prescribed movement is a person raising a hand, as described above. When the controller 20 detects the prescribed movement of a person while the autonomous driving vehicle 40 is traveling, the controller detects the person as a prospective passenger 50 who desires to board the autonomous driving vehicle 40. When the controller 20 detects the prospective passenger 50, the controller determines a stop location of the autonomous driving vehicle 40. The controller 20 uses various actuators to control the autonomous driving vehicle 40 such that the autonomous driving vehicle 40 stops at the determined stop location. The controller 20 stops the autonomous driving vehicle 40 at the stop location, opens the door 18, and boards the prospective passenger 50. Thereafter, if the prospective passenger 50 that was detected while the autonomous driving vehicle 40 was traveling is recognized inside the autonomous driving vehicle 40, prescribed equipment installed in the autonomous driving vehicle 40 is controlled such that the prospective passenger 50 can sit in the seat installed in the autonomous driving vehicle 40. Prescribed equipment can be a seat elevating device. If the information associated with the prospective passenger 50 that boarded the autonomous driving vehicle 40 matches or is similar to the information associated with the prospective passenger 50 registered in the storage device 13, the controller 20 controls the elevating device to lower the folded sitting portion. The prospective passenger 50 can thus sit in the reserved seat. Prescribed devices also include the authentication device 16 installed near the reserved seat.

Each of the functions described in the embodiments above may be implemented by means of one or more processing circuits. The processing circuits include a programmed processing device, such as a processing device that includes electronic circuits, and the like. In addition, the processing circuits include devices such as circuit components and application specific integrated circuits (ASIC) implemented to execute the described functions. The boarding permission determination device 1 and the boarding permission determination device 2 may enhance the functionality of the computer.

Embodiments of the present invention have been described above, but the descriptions and figures that form part of this disclosure should not be understood as limiting the present invention. From this disclosure, various alternative embodiments, examples, and operating techniques should be apparent to those skilled in the art.

For example, in the second embodiment, the prospective passenger 50 may reserve a vacant seat using the mobile terminal 70.

The invention claimed is:

1. A boarding permission determination device comprising:
   a sensor configured to be mounted on a vehicle and to capture images of objects in a periphery of the vehicle;
   a controller configured to detect pedestrians in the periphery of the vehicle based on the images captured by the sensor; and
   a storage device,
   the controller being configured to
      receive a first image acquired by the sensor and, based on the image, detect at least a prescribed movement and a characteristic of a person in the periphery of the vehicle while the vehicle is traveling,
      register, in the storage device, information indicating the characteristic of the person detected from the first image when the prescribed movement of the person is detected while the vehicle is traveling,
      determine a stop location for the vehicle,
      control the vehicle such that the vehicle stops at the stop location that was determined,
      receive a second image acquired by the sensor at the stop location,
      determine, based on the second image and the information registered in the storage device, whether the person detected in the periphery of the vehicle while the vehicle was traveling is present at the stop location, and
      control a prescribed device mounted on the vehicle such that the person can board the vehicle after the vehicle is stopped at the stop location upon determining that the person that was detected while the vehicle was traveling is present at the stop location.

2. The boarding permission determination device according to claim 1, wherein
   the controller is configured to cause the vehicle to start traveling without boarding the person after the vehicle is stopped at the stop location, when the person that was detected while the vehicle was traveling cannot be recognized for a prescribed period of time.

3. The boarding permission determination device according to claim 1, wherein
   the controller is configured to cause the vehicle to start traveling without boarding the person after the vehicle is stopped at the stop location, when a distance between the vehicle and the person that was detected while the vehicle was traveling increases with time.

4. The boarding permission determination device according to claim 1, wherein
   the controller is configured to audibly or visually notify a second person that the vehicle has been reserved after the vehicle is stopped at the stop location, if an operation of the prescribed device by the second person different than the person that was detected while the vehicle was traveling is detected.

5. The boarding permission determination device according to claim 4, wherein
   the controller is configured to transmit information relating to a current location of the vehicle to another vehicle, and instruct the other vehicle to come to the current location of the vehicle when a request by the second person for a vehicle to be dispatched is detected.

6. The boarding permission determination device according to claim 1, wherein
   the controller is configured to change a preset route and controls the vehicle such that the vehicle stops at the stop location when the prescribed movement of the person was detected while the vehicle is traveling.

7. The boarding permission determination device according to claim 1, wherein
   the controller is configured to acquire location information associated with the person or location information associated with the vehicle when the prescribed movement of the person was detected while the vehicle is traveling, and
   the controller is configured to determine the stop location based on the location information associated with the person or the location information associated with the vehicle.

8. The boarding permission determination device according to claim 1, wherein
   the controller is configured to send the stop location to a mobile terminal in possession of the person, or display the stop location on a display mounted on the vehicle when the prescribed movement of the person was detected while the vehicle is traveling.

9. The boarding permission determination device according to claim 2, wherein
   the controller is configured to calculate an estimated arrival time required for the person to arrive at the stop location based on location information of the person and location information of the stop location, and
   the controller is configured to cause the vehicle to start traveling after stopping the vehicle at the stop location, when the person detected while the vehicle was traveling cannot be recognized in an amount of time that exceeds the estimated arrival time.

10. The boarding permission determination device according to claim 1, wherein
    the prescribed device is a door lock control device that controls locking and unlocking of a door of the vehicle, or a door opening/closing control device that controls opening/closing of a door of the vehicle.

11. A boarding permission determination method comprising:
- detecting at least a prescribed movement of a person in a periphery of a vehicle based on a first image captured by a sensor mounted on the vehicle while the vehicle is traveling;
- detecting a characteristic of the person based on the first image;
- registering, in a storage device, information indicating the characteristic of the person detected from the first image when the prescribed movement of the person is detected while the vehicle is traveling;
- determining a stop location for the vehicle;
- controlling the vehicle such that the vehicle stops at the stop location that was determined;
- receive a second image captured by the sensor at the stop location,
- based on the second image and the information registered in the storage device, determining whether the person detected in the periphery of the vehicle while the vehicle was traveling is present at the stop location; and
- controlling a prescribed device mounted on the vehicle such that the person can board the vehicle after the vehicle is stopped at the stop location, upon determining that the person detected while the vehicle was traveling is present at the stop location.

12. A boarding permission determination device comprising:
- a sensor configured to be mounted on a vehicle and to capture images of objects in a periphery of the vehicle;
- a controller configured to detect pedestrians in the periphery of the vehicle based on the images captured by the sensor; and
- a storage device,
- the controller being configured to
  - receive a first image acquired by the sensor and, based on the first image, detect at least a prescribed movement and a characteristic of a person in the periphery of the vehicle while the vehicle is traveling,
  - register, in the storage device, information indicating the characteristic of the person detected from the first image when the prescribed movement of the person is detected while the vehicle is traveling,
  - determine a stop location for the vehicle,
  - control the vehicle such that the vehicle stops at the stop location that was determined,
  - receive a second image acquired by the sensor at the stop location,
  - determine, based on the second image and the information registered in the storage device, whether the person detected in the periphery of the vehicle while the vehicle was traveling is inside the vehicle, and
  - control a prescribed device mounted on the vehicle such that the person can sit in a seat installed in the vehicle after the vehicle is stopped at the stop location upon determining that the person detected while the vehicle was traveling is inside the vehicle.

13. A boarding permission determination method comprising:
- detecting at least a prescribed movement of a person in a periphery of a vehicle based on a first image captured by a sensor mounted on the vehicle while the vehicle is traveling;
- detecting a characteristic of the person based on the first image;
- registering, in a storage device, information indicating the characteristic of the person detected from the first image when the prescribed movement of the person is detected while the vehicle is traveling;
- determining a stop location for the vehicle;
- controlling the vehicle such that the vehicle stops at the stop location that was determined;
- receiving a second image captured by the sensor at the stop location,
- based on the second image and the information registered in the storage device, determining whether the person detected in the periphery of the vehicle while the vehicle was traveling is inside the vehicle; and
- controlling a prescribed device mounted on the vehicle such that the person can sit in a seat installed in the vehicle after the vehicle is stopped at the stop location upon determining that the person detected while the vehicle was traveling is inside the vehicle.

* * * * *